(12) United States Patent
Arthur et al.

(10) Patent No.: US 9,335,844 B2
(45) Date of Patent: May 10, 2016

(54) COMBINED TOUCHPAD AND KEYPAD USING FORCE INPUT

(71) Applicant: SYNAPTICS INCORPORATED, Santa Clara, CA (US)

(72) Inventors: Kevin Arthur, San Jose, CA (US); Jerry Shao, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 100 days.

(21) Appl. No.: 13/715,302

(22) Filed: Dec. 14, 2012

(65) Prior Publication Data

US 2013/0154938 A1 Jun. 20, 2013

Related U.S. Application Data

(60) Provisional application No. 61/577,567, filed on Dec. 19, 2011.

(51) Int. Cl.
| | |
|---|---|
| *G09G 5/08* | (2006.01) |
| *G06F 3/041* | (2006.01) |
| *G06F 3/044* | (2006.01) |
| *G06F 3/0488* | (2013.01) |

(52) U.S. Cl.
CPC .............. *G06F 3/041* (2013.01); *G06F 3/044* (2013.01); *G06F 3/0416* (2013.01); *G06F 3/04886* (2013.01); *G06F 2203/04105* (2013.01)

(58) Field of Classification Search
CPC ......... G06F 3/02; G06F 3/021; G06F 3/0213; G06F 3/0238; G06F 3/03547; G06F 3/041–3/047; G06F 3/048; G06F 3/0488; G06F 3/04886

USPC ............ 345/156, 168–178; 178/18.01–18.09, 178/18.11
See application file for complete search history.

(56) References Cited

U.S. PATENT DOCUMENTS

| | | | |
|---|---|---|---|
| 5,943,044 | A | 8/1999 | Martinelli et al. |
| 7,312,791 | B2 * | 12/2007 | Hoshino et al. ............... 345/173 |
| 7,649,478 | B1 * | 1/2010 | Yoon ..................... H03M 11/08 |
| | | | 341/107 |
| 7,817,143 | B2 * | 10/2010 | Soh et al. ....................... 345/170 |
| 2003/0201971 | A1 * | 10/2003 | Iesaka .......................... 345/156 |
| 2003/0235452 | A1 | 12/2003 | Kraus et al. |
| 2005/0099403 | A1 * | 5/2005 | Kraus et al. ................... 345/173 |
| 2005/0212777 | A1 * | 9/2005 | Ing et al. ....................... 345/173 |
| 2007/0291007 | A1 * | 12/2007 | Forlines et al. ............... 345/173 |
| 2008/0052422 | A1 * | 2/2008 | Zhu et al. ........................ 710/14 |
| 2009/0237373 | A1 | 9/2009 | Hansson |

(Continued)

OTHER PUBLICATIONS

Sorrel, C., "Media Keyboard Has Configurable Touch-Screen Side-Panel" [online]. Wired.com, Jun. 3, 2010 [retrieved on Jan. 7, 2011]. Retrieved from Internet: <URL:http://www.wired.com/gadgetlab/?s=Media+Keyboard+Has+Configurable+Touch-Screen+Side-Panel>.

(Continued)

*Primary Examiner* — Stephen Sherman
(74) *Attorney, Agent, or Firm* — Osha Liang LLP

(57) ABSTRACT

Methods, systems and devices are described for determining positional information and force information for input objects using an input device. The various embodiments provide improved user interface functionality by detecting positional information and force information at a sensing surface having a configurable sub-region, and operating the input device in either a touchpad mode or a keypad mode based on whether the force information exceeds a threshold value.

14 Claims, 5 Drawing Sheets

(56) References Cited

U.S. PATENT DOCUMENTS

| | | | |
|---|---|---|---|
| 2009/0249235 A1* | 10/2009 | Kim et al. | 715/765 |
| 2010/0088654 A1 | 4/2010 | Henhoeffer | |
| 2010/0090964 A1* | 4/2010 | Soo et al. | 345/173 |
| 2010/0123678 A1* | 5/2010 | Kim et al. | 345/174 |
| 2012/0019448 A1* | 1/2012 | Pitkanen et al. | 345/173 |

OTHER PUBLICATIONS

Mobee Technology Ltd., "The Magic Numpad" [online], Model: MO6210 Datasheet, 2010. Retrieved from Internet: <URL:http://www.mobeetechnology.com/images/stories/Datasheet%20-%20Magic%20Numpad%20-%20EN%20-%20Low.pdf>.

Bolender, Robert James et al, "Input Device with Integrated Deformable Electrode Structure for Force Sensing" U.S. Appl. No. 13/238,783, filed Sep. 21, 2011.

Schediwy, R. et al., "Input Device with Force Sensing" U.S. Appl. No. 12/777,829, filed May 11, 2010.

Hsieh, Lin Hsiung et al., "Input Device with Force Sensing" U.S. Appl. No. 13/316,279, filed Dec. 9, 2011.

Bulea, Mihai M., "System and Method for Measuring Individual Force in Multi-Object Sensing" U.S. Appl. No. 12/636,952, filed Dec. 14, 2009.

* cited by examiner

COMBINED TOUCHPAD AND KEYPAD USING FORCE INPUT

PRIORITY INFORMATION

This application claims priority to U.S. Provisional Patent Application Ser. No. 61/577,567, filed Dec. 19, 2011.

FIELD OF THE INVENTION

This invention generally relates to electronic devices, and more specifically relates to sensor devices and using sensor devices for producing user interface inputs.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices also have the ability to detect and determine force applied to a sensing surface, in addition to determining positional information. However, such input devices cannot provide different types of input, such as pointing and key entry without a mode switch. This limits the flexibility and usability of the input device. Thus, there exists a need for an input device that enhances device flexibility and usability by using both force and positional information to capture different types of user input without requiring the use of a mode switch.

BRIEF SUMMARY OF THE INVENTION

The embodiments of the present invention provide a device and method that facilitates improved device usability. Specifically, the device and method provide improved user interface functionality by facilitating user input with input objects using both force and positional information. The input device includes a processing system and an array of sensor electrodes adapted to capacitively sense objects at a sensing surface. The input device is adapted to provide user interface functionality by operating the input device either as a touchpad or as a keypad depending on the level of applied force.

According to various embodiments, an input device is capable of detecting multiple levels of force, and performing various functions (e.g., pointing, gestures, and keypad entry) by using the force information to distinguish user inputs. The resulting force information, particularly when combined with the positional information, may be used to provide a wide range of user interface functionality and flexibility.

In one embodiment, an input device includes a sensing region that may be segmented into a plurality of activation regions (referred to herein as "sub-regions" within the sensing region). The input device is configured to indicate a first action when an input object is proximate to a sub-region, and when the applied force satisfies a first force threshold but does not satisfy a second force threshold. The input device is configured to indicate a second action when the input object is proximate to the sub-region and when the applied force satisfies both the first force threshold and the second force threshold. In one embodiment the first and second actions are different, and the first and second force thresholds are different. The number of force ranges and the location of force thresholds may be based on, inter alia, the number of force levels that can be distinguished by the input device, the number of actions to be performed, and the ability of the user to reliably apply a desired amount of force on the sensing region.

In one embodiment, the input device (e.g., the sensing region) comprises a plurality of displayed keys, wherein each of the plurality of sub-regions corresponds to a displayed key. In one embodiment, each of the plurality of sub-regions corresponds to a different displayed key. In one embodiment, the displayed keys may be in the form of an overlay, wherein the overlay may be implemented as a physical film, screen, or template positioned over the sensing region. In other embodiments, the input device comprises a display configurable to display the displayed keys.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. User interface functionality may be enhanced by detecting positional information and force information at a sensing surface having a configurable sub-region, and operating the input device in either a touchpad mode or a keypad mode based on whether the force information exceeds a threshold value.

Figure 1:
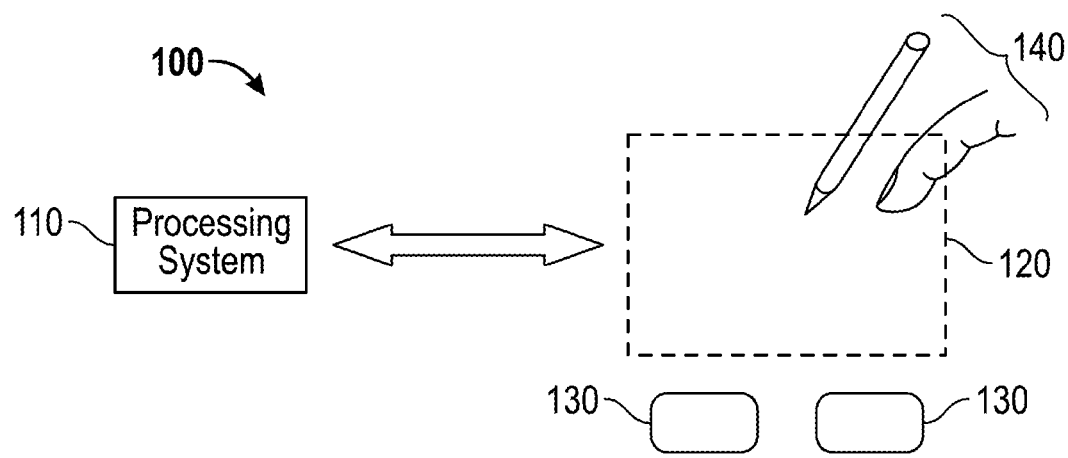
FIG. 1 is a block diagram of an exemplary electronic system that includes an input device and a processing system in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a deflection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
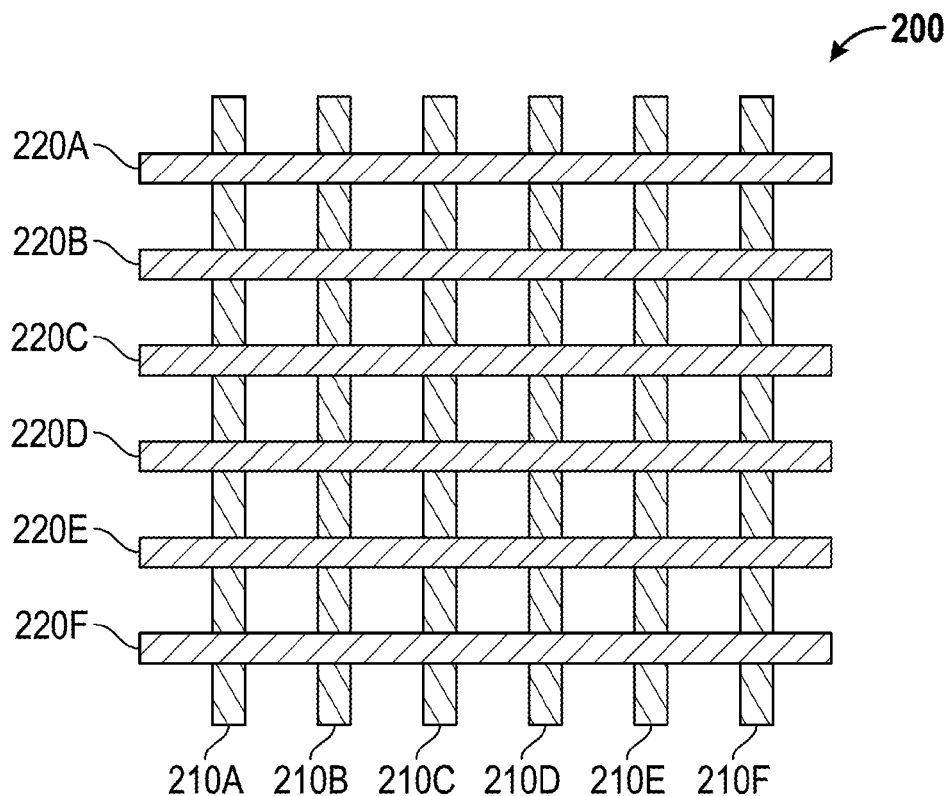
FIG. 2 is schematic view of a portion of an exemplary sensor electrode pattern in accordance with an embodiment of the invention.

FIG. 2 shows a portion of an example sensor electrode pattern configured to sense in a sensing region associated with the pattern, according to some embodiments. For clarity of illustration and description, FIG. 2 shows a pattern (e.g., an array) 200 of simple rectangles, and does not show various components. This sensor electrode pattern comprises a first plurality of sensor electrodes 210 (210A-210F) and a second plurality of sensor electrodes 220 (220A-220F) disposed over the first plurality of sensor electrodes 160.

Sensor electrodes 210 and sensor electrodes 220 are typically ohmically isolated from each other. That is, one or more insulators separate sensor electrodes 210 and sensor electrodes 220 and prevent them from electrically shorting to each other. In some embodiments, sensor electrodes 210 and sensor electrodes 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and sensor electrodes 220 are separated by one or more layers of insulative material. In some other embodiments, sensor electrodes 210 and sensor electrodes 220 are separated by one or more substrates; for example, they may be disposed on opposite sides of the same substrate, or on different substrates that are laminated together. Moreover, one or more of the sensor electrodes can be used for both capacitive sensing and for updating the display.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 3:
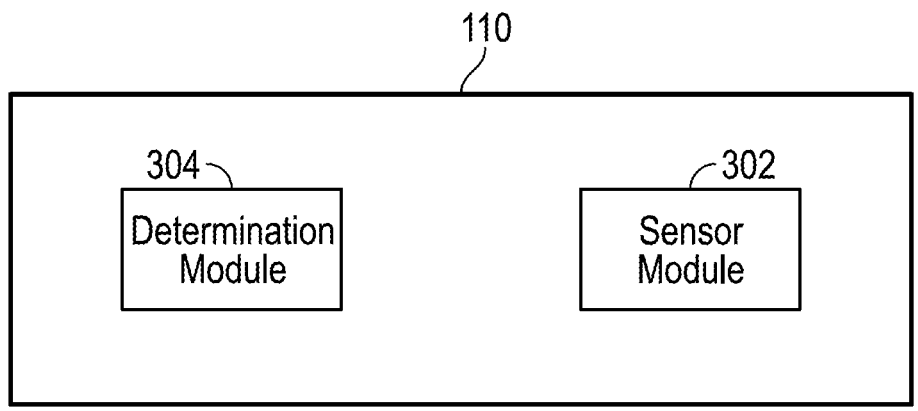
FIG. 3 is a schematic view of an exemplary processing system in accordance with an embodiment of the invention.

Referring now to FIGS. 1 and 3, the processing system 110 includes a sensor module 302 and a determination module 304. Sensor module 302 is configured to receive resulting signals from the sensor electrodes associated with sensing region 120. Determination module 304 is configured to process the data, and to determine positional information and the force information for one or more input objects in the sensing region. By evaluating the force information against multiple force threshold values, the input device 100 may be selectively operated in various modes, such as a first mode (e.g., corresponding to a touchpad) or a second mode (e.g., corresponding to a keypad) depending on whether the force information satisfies one or more threshold values.

The embodiments of the invention can be used to enable a variety of different capabilities on the input device. Specifically, it can be used to enable the same input device that is used for cursor positioning, scrolling, dragging, and icon selection, and other user input at the surface, to receive input in the form of objects above the surface. As one specific example, a touch screen or other capacitive sensing device can be adapted to close windows on a desktop, put a computer into sleep mode, or perform some other type of mode switch in response to the user swiping a hand over the sensor.

According to various embodiments, an input device is provided which is capable of detecting multiple levels of force. The input device can perform various functions (e.g., pointing, gestures, and keypad entry) by using force information to distinguish user inputs interacting with the sensing surface at different applied force levels. In some embodiments, a separate modal switch may or may not be provided.

Figure 4:
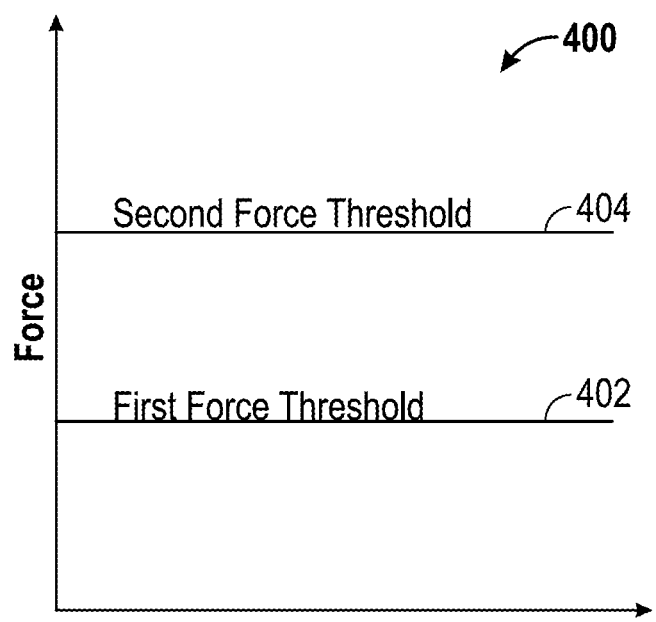
FIG. 4 is a force level mapping diagram in accordance with an embodiment of the invention.

Referring now to FIG. 4, a force plot 400 illustrates a first force threshold value 402 and a second force threshold value 404, although additional values (levels) may also be implemented in the context of the present invention.

Figure 5:
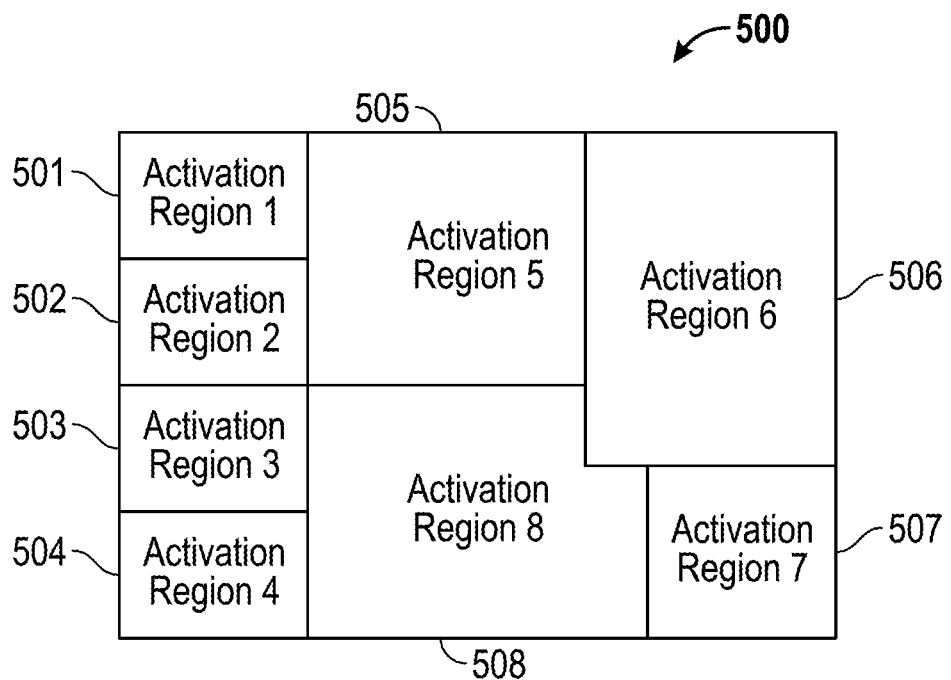
FIG. 5 is a schematic diagram of a sensing region showing a plurality of activation regions (sub-regions) in accordance with an embodiment of the invention.

Referring now to FIG. 5, in one embodiment an input device comprises a sensing region 500 segmented into a plurality of activation regions, referred to herein as sub-regions 501-508. The input device is configured to indicate a first action when an input object is proximate to a first sub-region (e.g., sub-region 501) and when the applied force satisfies a first force threshold (e.g., threshold 402) but does not satisfy a second force threshold (e.g., threshold 404). Further, the input device is configured to indicate a second action when the first input object is proximate to the first sub-region and when the applied force satisfies both the first force threshold and the second force threshold. Further, the first action and the second action are different.

The sub-regions may be similar in shape and size or may differ in shape and size. Further, in various embodiments, a sensing region may be segmented into a greater number or lesser number of sub-regions. In some embodiments, the sub-regions are determined based on a particular application chosen by the user or chosen by the input device, a host electronic device with which the input device is being used, or by application software running on the input device or on the host processor. In various embodiments, when switching between applications the sub-region configuration may be adjusted accordingly. Further, in various embodiments, the shape/outline of one or more sub-regions may be indicated by an overlay, display or the like. For example, the sub-regions may correspond to the keys of a number pad. In one embodiment, the input device may be configured to determine when an input object is proximate a particular sub-region based on the positional information of the input object.

In one embodiment, the input device may comprise a plurality of displayed keys, where each sub-region corresponds to a displayed key. Moreover, each sub-region may correspond to a different displayed key. In an embodiment, the keys may be displayed through the use of a plastic film overlay which functions as a template. Alternatively, the input device may comprises a display device configured to display the displayed keys.

By way of non-limiting example, in a typical embodiment the user may press sub-region 501 with a light force (i.e., a force level which meets or exceeds the first threshold) to thereby indicate or select (but not activate) sub-region 501. If the user then presses down harder, sub-region 501 may be activated. If the user does not press down harder, the user may move to another sub-region without activating sub-region 501. This is analogous to highlighting an icon to identify it as a possible candidate for activation by pressing it lightly, and activating the icon only if it is pressed harder. In a typical example, each sub-region may represent a different software application (e.g., a word processing program, a spreadsheet application, a Powerpoint™ program, and the like). The user may select (highlight) a particular application by lightly pressing its corresponding display key (sub-region), and launch the application by pressing the display key more firmly.

With continued reference to FIGS. 4 and 5, an exemplary force level mapping (FIG. 4) may correspond to force applied in any one (or more) of the sub-regions 501-508. The force level mapping comprises one or more force levels indicating the amount of force applied to the input device, which may be configured to detect a large number of force levels, only a few force levels, or one force level. The force levels may be segmented by force thresholds which establish boundaries (e.g., upper, lower, or both) between force ranges. Force ranges may be associated with various functions, (i.e., first action, second action, third action, etc.) such that it is possible for the user to activate a given function by applying a given force to the input device. The number of force ranges and values of force thresholds may be based on the number of force levels that can be distinguished by the input device, the number of functions to be performed, and the ability of the user to reliably apply a desired amount of force on the input device, among other factors. While FIG. 4 illustrates a first and second force threshold, in other embodiments, more than two force thresholds may be used.

In some embodiments, the first action may be indicated when an input object is proximate at least one of a first sub-region and a second sub-region and when an applied force satisfies at least a first force threshold. Further, a second action may be indicated when the input object is proximate the first sub-region and when an applied force satisfies a first and second force threshold, and a third action may be indicated when the input object is proximate to the second sub-region and when an applied force satisfies a first and second force threshold, where the first, second and third actions differ. In various embodiments, at least two activation regions may correspond to the same action when the first force threshold is satisfied and each activation corresponds a different action when the first and second force thresholds are satisfied.

In various embodiments, the first and second actions may be further based on the time component of the force information. For example, the second action may not be indicated until the applied force is greater than and/or equal to the second force threshold for a period of time that satisfies a time period criterion/threshold. In various embodiments, the first and second actions comprise, but are not limited to, pointing, gestures, single and multiple mouse button clicks, icon selection, overlay or displayed key selection, and the like. As a result, the input device is capable of accepting at any given time a variety of input types.

For example, force information corresponding to an applied force that is greater than and/or equal to the first force threshold and less than and/or equal to the second force threshold may be indicative of a first action. Force information corresponding to an applied force that is greater than the first force threshold and greater than and/or equal to the second force threshold is indicative of a second action.

In an embodiment, images or icons can be displayed on the input device and the input device can perform functions associated with the images or icons. In various embodiments, the action (or function) corresponding to each image or icon corresponds to positional information and force information. For example, an action corresponding to a first image or icon may correspond to a first sub-region and the second force level. In such an example, the action is indicated based on positional information and force information corresponding to an input object. In an embodiment, images or icons may comprise buttons. By correlating the locations of the sub-regions of various buttons with the location of the input, it is possible to determine which button was pressed. In one embodiment, a function corresponding to an image or icon may be performed based at least on the positional information and force information of at least one input object.

Positional information can be used to further refine how force information is interpreted. For example, if there is significant motion preceding an applied force that satisfies the first and second force thresholds, it is more likely that the user intended the press to be interpreted as a first action rather than a second action. Similarly, it is more likely that a user intends a second action when applying a force satisfying the first and second thresholds when there are other second actions indicated substantially immediately preceding it. Positional information can also be correlated to lift events, such as when a user removes their finger from the input device, to reduce accidental activations. In particular, a second action may be suppressed if there is significant motion between the second action and lift event because it is likely that the user actually intended to perform a different action, such as a drag.

The above examples are intended to illustrate several of the functions that could be performed for various degrees, levels, thresholds, or ranges of force. Other functions that could be performed for a given level of force include, but are not limited to, scrolling, clicking (such as double, triple, middle, and right mouse button clicking), changing window sizes (such as minimizing, maximizing, or showing the desktop), and changing parameter values (such as volume, playback speed, brightness, z-depth, and zoom level).

Force information can also be used to enable one type of input device to simulate more closely the native functionality provided by a different type of input device. To illustrate, input devices can be often be classified as either direct or indirect. Indirect input devices typically operate in conjunction with a cursor (i.e., conventional mice and touchpads). In contrast, direct input devices, such as conventional touchscreens, typically enable the user to interact with objects displayed on screen by touching the object (i.e., without the necessity of a cursor). Issues may arise if a user attempts to use a conventional indirect input device in the same way as they would use a direct input device. For instance, when a user inputs a "swipe" gesture by swiping their finger from the edge of a touchscreen to its center, the touchscreen can recognize that a user is inputting a gesture to pan the desktop. However, if a user were to perform a swipe gesture on a conventional touchpad, it may be unclear whether the user is intending a swipe gesture or merely relocating the cursor. By using a force enabled input device it is possible to more closely emulate the functionality of direct input devices with indirect input devices, for example.

Furthermore, by enabling direct input devices to determine an applied force it is possible to incorporate features more often associated with indirect input device. For example, touchscreens can display one or more cursors, such as "finger-blobs," wherever a user touches the screen. However, it may not be possible for the user to reposition their fingers after contact with the touchscreen because the touchscreen cannot disambiguate a user's intention to pan the display from merely repositioning the finger-blobs.

Nevertheless, by using an input device able to determine applied forces the user would be able to position (and reposition) the finger-blobs by applying light force. Once the finger-blobs are properly located, applying heavy force will select (i.e., highlight) the object located at the selected location. Furthermore, if the user lifts their fingers at this time, the object can remain selected (or can deselected after a period of time) without activating the object. If instead the user presses harder, the object can be activated.

As another example, some direct input devices enable a user to select a displayed item by touching the item. However, if a user touches a program icon it may be unclear whether the user intends to execute (i.e., open) the program or merely select the icon so that it can be moved to the trashcan. Nevertheless, a force enabled touchscreen could easily distinguish these cases by correlating selection with an applied force satisfying a first force threshold and not a second and execution with the applied force satisfying a first force threshold and a second force threshold, for example.

It is also possible to adjust the sensitivity of the input device by changing the force thresholds. These configurations can be performed manually by the user via software settings. Alternatively, or in addition to, various touch algorithms can automatically adjust one or more force thresholds (e.g., based on historical usage data).

Figure 6:
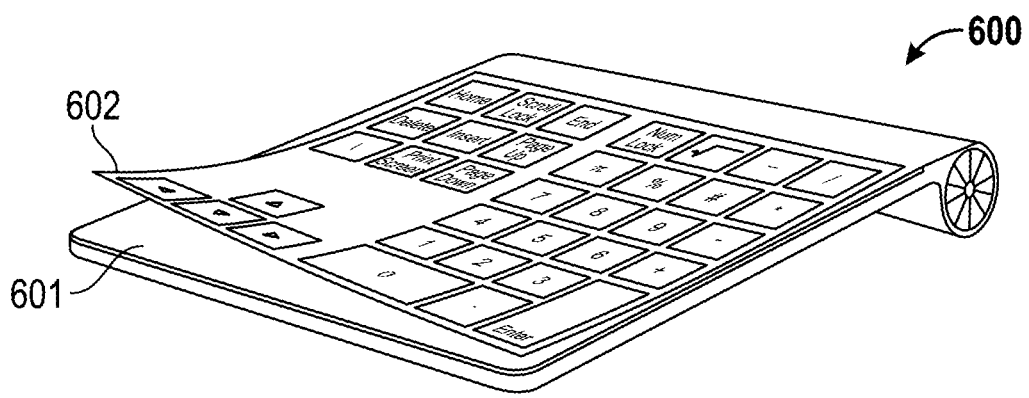
FIG. 6 is a schematic diagram of an exemplary stand-alone input device illustrating a keypad overlay in accordance with an embodiment of the invention.

Referring now to FIG. 6, an exemplary input device 600 may include a sensing surface 601 and an overlay 602 to facilitate keypad operation d on a force enabled input device.

The keypad overlay provides a visual reference for the plurality of activation regions, for the user to input text and commands. In various embodiments each "key" may correspond to a different activation region. FIG. 6 illustrates a stand-alone input device (i.e., separate from a keyboard or other electronic device). However, according to various embodiments, the input device can integral to a keyboard or e other electronic device, separable from the keyboard or device, or mechanically decoupled therefrom. In addition, one or more input devices can be used with an electronic system.

Figure 7A:
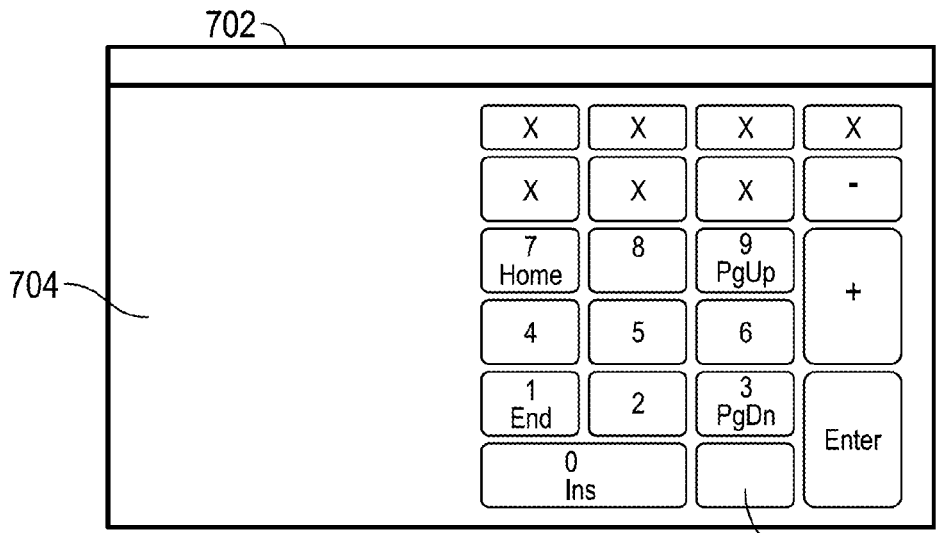
FIGS. 7A-7C are schematic representations of various keypad layouts and configurations in accordance with an embodiment of the invention.
Figure 7B:
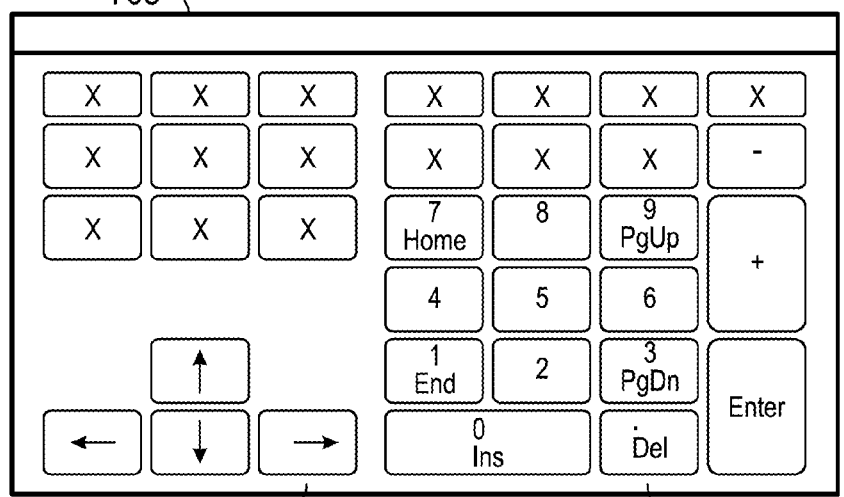
Figure 7C:
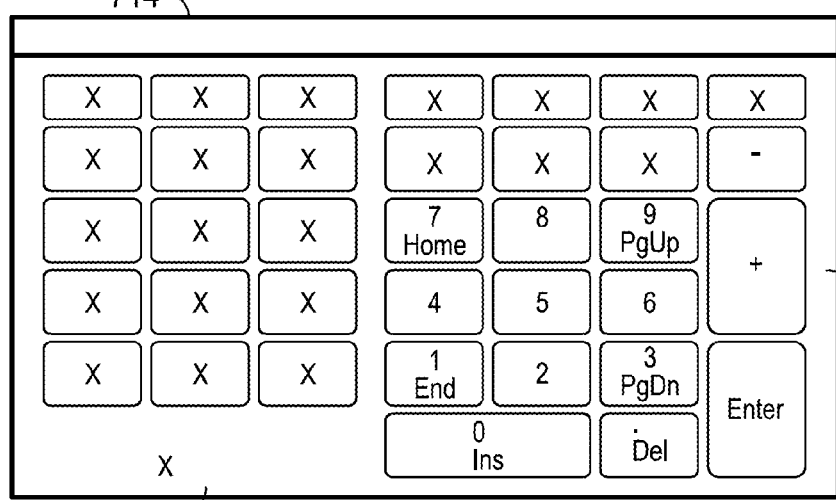

Referring now to FIGS. 7A-7C, exemplary overlays may comprise any film (e.g., plastic) or sticker which does not prevent operation of the input device. The overlays may be removable such that the input device can be used without overlays or with overlays having different button arrangements. By way of non-limiting example, FIG. 7A illustrates an overlay 704 including a touch input area 704 and a numeric keypad area 706; FIG. 7B illustrates an overlay 708 including a numeric keypad are 710 and a navigation and editing key area 712; and FIG. 7C illustrates an overlay 714 including a numeric keypad area 716 and a custom key area 718. Users can also customize the overlays by specifying that particular actions be performed when a given button (sub-region) on the overlay is pressed. For example, custom buttons can be provided for running macros or shortcuts (e.g., cut, paste, file navigation, show desktop, lock screen, search, command line interface, etc.).

Different overlays, and corresponding activations regions, can be recognized by the input device by either manual or automatic means. For example, the user can select a particular overlay, and corresponding activation regions, in software. Alternatively, or in addition to, the input device can identify different overlays, and corresponding activation regions, by visual, electronic, or electromagnetic means. For example, the overlay can comprise a barcode, patterned passive metallic or magnetic material, RFID transceiver, capacitive element, or electrical communications connection.

Figure 8:
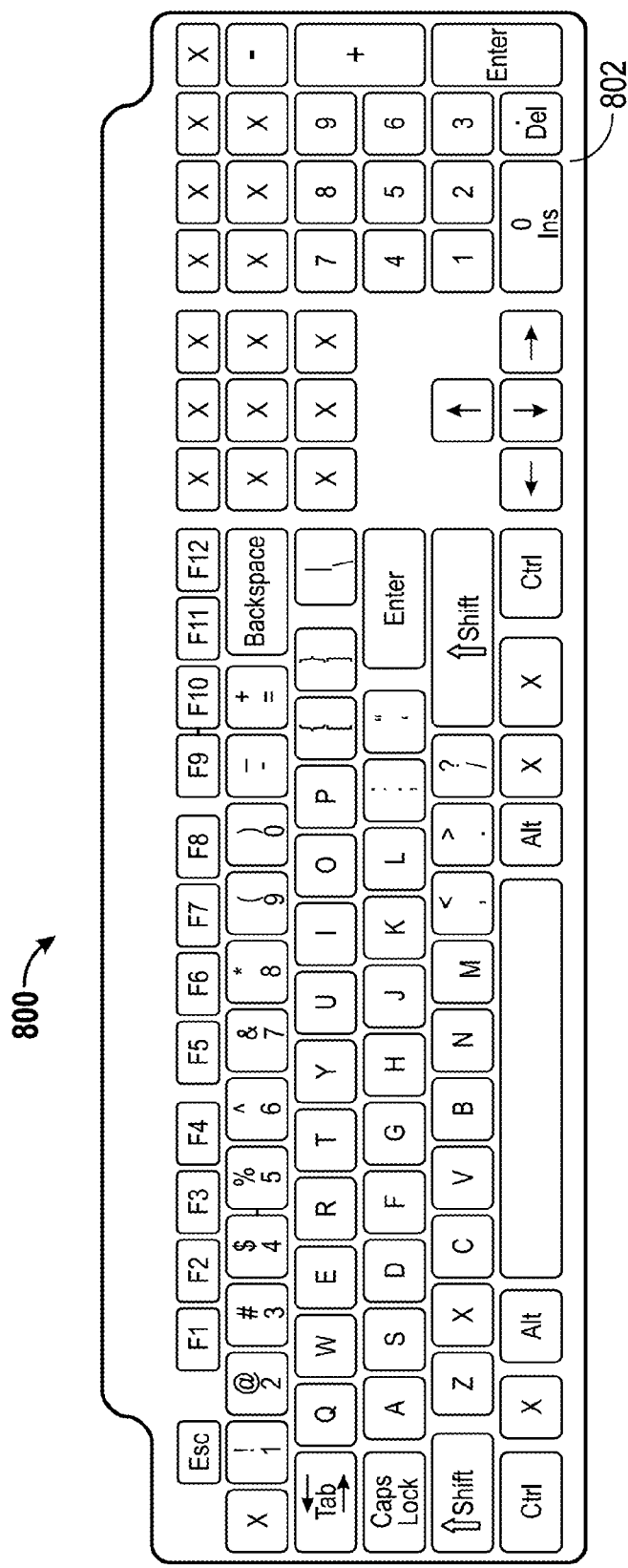
FIG. 8 is an exemplary input device including a display and integrated into a keyboard in accordance with an embodiment of the invention.

Referring now to FIG. 8, according to various embodiments, an exemplary input device 800 may include a display 802. FIG. 8 illustrates an electronic device (e.g., a keyboard) configured to provide a simulated numeric keypad, corresponding to plurality of activation regions, by displaying an image of a numeric pad on the display 802. According to various embodiments, the user can input a number by providing a heavy touch on the image of a given key. Furthermore, the user can use the input device to perform pointing and clicking functions by applying different levels of applied forces, respectively, to the input device. Although a numeric pad is shown, alternative keypad overlays could be displayed instead.

In various embodiments, visual, audible, haptic, or other feedback may be provided to the user to indicate the amount of force has been applied. For example, a light can be illuminated or an icon displayed to show the amount of force applied to the input device. Alternatively, or in addition to, a cue, such as an icon of the layout, can be displayed on screen.

Integrating a display with the input device facilitates customizable and dynamic user input methods. For example, the user can select custom layouts, and corresponding activation regions, for display on the input device and different layouts can be provided for different programs or types of user input. In particular, a user can select for display on the input device a layout for a basic or scientific calculator; or a numeric pad when performing significant numerical data entry, such as when using a spreadsheet. Furthermore, the input device can display brushes, color pallets, layers, and effects when the user is editing photos. Further still, it can display entities, coordinates, layers, snap, zoom, and electrical or plumbing symbols when a CAD program is used. Of course, it is possible to user other types of programs and layouts.

Selection of different layouts can be performed manually by the user or dynamically by the input device based on the program in current use by the user, for example. As a result, it is possible for a user to provide different types of input, such as pointing, clicking, and button pressing, and for the input device to dynamically provide different layouts without requiring use of a separate modal switch. Accordingly, usability is improved because users do not have to remember specific mode switches, or using the switches to change between types of input (e.g., pointing, clicking, and button pressing) or different layouts. In addition, tasks can be performed more efficiently because there are fewer required steps. Further still, electronic devices can be made smaller and less expensively, while increasing functionality, by facilitating richer user-device interaction.

An input device is thus provided which includes a sensing surface configured to detect positional information and force information for an input object, wherein the sensing surface comprises at least one sub-region and wherein the position of the sub-region within the sensing surface is configurable. The input device includes a determination module configured to select one of a first a mode of operation comprising a touchpad mode and a second mode of operation comprising a keypad mode based on whether the force information exceeds a threshold value. The input device is configured to be operated according to the selected mode of operation. The input device may include a touchscreen, wherein the touchscreen comprises the sensing surface.

In an embodiment, the determination module may be configured to operate the input device in the keypad mode when the force information exceeds the threshold value, and to operate the input device in the touchpad mode when the force information does not exceed the threshold value.

In an embodiment, the position of the sub-region within the sensing surface is dynamically configurable by either a user of the input device, a software application, or both. Alternatively, the position of the sub-region within the sensing surface may statically configurable by a manufacturer of the input device. The sub-region or sub-regions may partially overlap the sensing surface, or they may be substantially coextensive with the sensing surface.

In one embodiment, the force information includes a first force level corresponding to the selection of a sub-region, and a second force level corresponding to the activation of the selected sub-region.

In an embodiment, the sensing surface may include a plurality of sub-regions, wherein each sub-region corresponds to a respective one of a plurality of user selectable items such as, for example, an alphanumeric character, a symbol, a command, and/or an icon.

In a further embodiment the input device may be configured to display an overlay, wherein the overlay defines a unique arrangement of the plurality of sub-regions and is configured for attachment to and removal from the input device.

In an embodiment, the input device may be configured for use with a host electronic device having a host a processor, and wherein the input device may be further configured to be selectively operated in one of the keypad mode and the touchpad mode based on a software application running on the host processor. In another embodiment, the application may include an interactive training program for use by the user in determining one or more of the force threshold values.

In another embodiment, the input device may be integrated into a keyboard which communicates with the processor. In another embodiment, the host processor may provide feedback to the user regarding one or a combination of the layout of the sub-region(s), the position information, the force information, and any other desirable metrics. Exemplary feedback may be in the form of visual, audio, or haptic information.

In an embodiment, the sensing surface may include a first array of electrodes for capacitively detecting the position information, and a second array of electrodes for detecting the force information.

An input device is also provided which includes a display; a sensing region configured to detect position information and force information for an input object in the sensing region, wherein the sensing surface comprises a sub-region and wherein the position of the sub-region within the sensing surface is configurable; and a determination module configured to position a cursor on the display in accordance with the position information when the force information is below a threshold value, and to select the sub-region when the force information is above the threshold.

In an embodiment, the force information may include a first force threshold and a second force threshold, where the determination module is configured to select the sub-region when a force applied by the input object satisfies the first force threshold but does not satisfy the second force threshold, and to activate the selected sub-region when the force applied by the input object satisfies the first force threshold and the second force threshold.

A program product is also provided which includes an input device sensor program and non-transitory computer-readable media on which the input module sensor program resides. In one embodiment, the input device sensor program is configured to: detect position information and force information for an input object interacting with a sensing surface of the input device; select one of a first a mode of operation comprising a touchpad mode and a second mode of operation comprising a keypad mode based on whether the force information exceeds a threshold value; and operate the input device according to the selected mode of operation.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device comprising:
    a sensing surface configured to detect positional information and force information for an input object, wherein the sensing surface comprises a plurality of non-overlapping sub-regions, and wherein the respective positions of the plurality of non-overlapping sub-regions within the sensing surface are dynamically configurable by at least one of: a user of the input device; and a software application; and
    a determination module configured to:
        dynamically select one of a touchpad mode and a keypad mode based on the software application executing on a host processor, wherein, while in touchpad mode, the determination module detects movement of the input object on the sensing surface; and dynamically select, based on the force information and while in the touchpad mode, an operation from a plurality of operations comprising a positioning operation when the force information specifies a first force level, a selection operation when the force information specifies a second force level, and an activation operation when the force information specifies a third force level, wherein the positioning operation is to update a display based on the positional information from a sub-region of the plurality of non-overlapping sub-regions, the selection operation is to select the sub-region located at the position, and the activation operation is to execute a program corresponding to the sub-region, wherein the input device is configured to be operated according to the operation.

2. The input device of claim 1, further comprising a touchscreen, the touchscreen comprising the sensing surface.

3. The input device of claim 1, wherein the plurality of non-overlapping sub-regions comprise less than the entirety of the sensing surface.

4. The input device of claim 1, wherein the plurality of non-overlapping sub-regions are substantially coextensive with the sensing surface.

5. The input device of claim 1, wherein each of the plurality of non-overlapping sub-regions corresponds to a respective one of a plurality of user selectable items.

6. The input device of claim 5, wherein the input device is configured to display an overlay, wherein the overlay defines a unique arrangement of the plurality of non-overlapping sub-regions and is configured for attachment to and removal from the input device.

7. The input device of claim 5, wherein at least one of the plurality of user selectable items comprises an alphanumeric character, a symbol, a command, and an icon.

8. The input device of claim 1, wherein the input device is configured for use with a host electronic device having the host processor.

9. The input device of claim 8, further comprising a keyboard communicatively coupled to the host processor, and wherein the input device comprises a portion of the keyboard.

10. The input device of claim 9, wherein the host processor is configured to provide feedback to the user regarding at least one of: the layout of the sub-regions; and the positional information.

11. The input device of claim 10, wherein the feedback comprises at least one of: visual, audio, and haptic information.

12. The input device of claim 1, wherein the sensing surface comprises a first array of electrodes for capacitively detecting the positional information, and a second array of electrodes for detecting the force information.

13. An input device comprising:
a display;
a sensing region configured to detect positional information and force information for an input object in the sensing region, wherein the sensing surface comprises a plurality of non-overlapping sub-regions and wherein the respective positions of the plurality of non-overlapping sub-regions within the sensing surface are dynamically configurable by at least one of: a user of the input device; and a software application; and
a determination module configured to:
select one of a touchpad mode and a keypad mode based on the software application executing on a host processor, wherein, while in touchpad mode, the determination module detects movement of the input object on the sensing surface; and
select, based on the force information and while in the touchpad mode, an operation from a plurality of operations comprising a positioning operation when the force information specifies a first force level, a selection operation when the force information specifies a second force level, and an activation operation when the force information specifies a third force level, wherein the positioning operation is to update a display based on the positional information from a sub-region of the plurality of non-overlapping sub-regions, the selection operation is to select the sub-region located at the position, and the activation operation is to execute a program corresponding to the sub-region.

14. A program product comprising:
A) an input device sensor program configured to:
detect positional information and force information for an input object interacting with a plurality of non-overlapping sub-regions of a sensing surface of the input device, wherein the respective positions of the plurality of non-overlapping sub-regions within the sensing surface are dynamically configurable by at least one of: a user of the input device; and a software application;
select one of a touchpad mode and a keypad mode based on the software application executing on a host processor, wherein, while in touchpad mode, the input device sensor program detects movement of the input object on the sensing surface;
select, based on the force information and while in the touchpad mode, an operation from a plurality of operations comprising a positioning operation when the force information specifies a first force level, a selection operation when the force information specifies a second force level, and an activation operation when the force information specifies a third force level, wherein the positioning operation is to update a display based on the positional information from a sub-region of the plurality of non-overlapping sub-regions, the selection operation is to select the sub-region located at the position, and the activation operation is to execute a program corresponding to the sub-region; and
operate the input device according to the operation; and
B) non-transitory computer-readable media on which the input module sensor program resides.

* * * * *